J. P. HEDSTROM.
REST FOR SAW SHARPENING MACHINES.
APPLICATION FILED JULY 15, 1909.
1,022,479.
Patented Apr. 9, 1912.
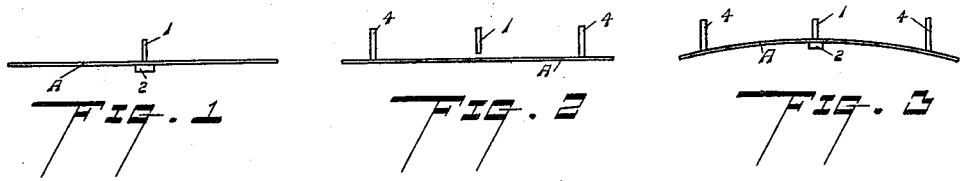
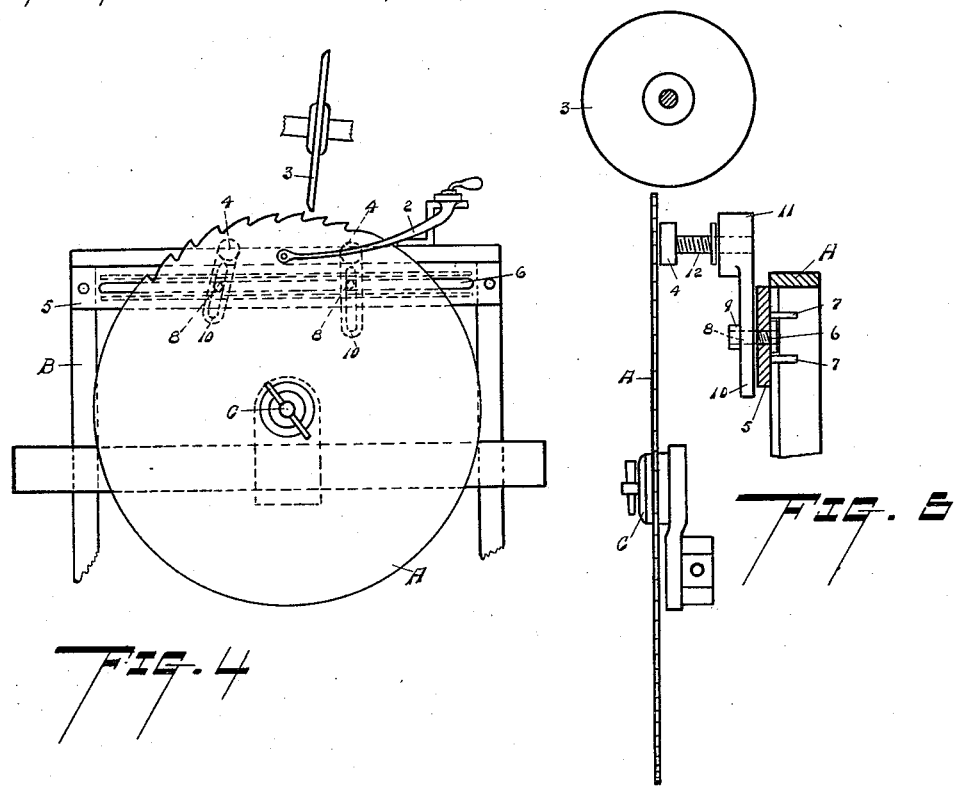
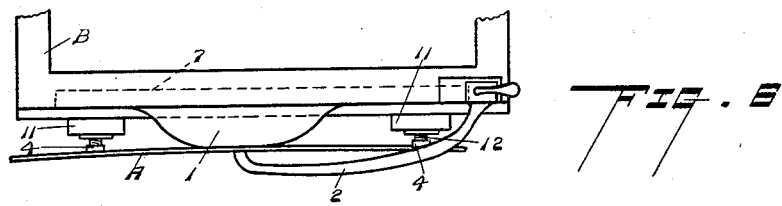
WITNESSES:
INVENTOR
John P. Hedstrom
BY
Geo. B. Willcox
ATTORNEY
COLUMBIA PLANOGRAPH CO., WASHINGTON, D. C.

UNITED STATES PATENT OFFICE.

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

REST FOR SAW-SHARPENING MACHINES.

1,022,479. Specification of Letters Patent. Patented Apr. 9, 1912.

Application filed July 15, 1909. Serial No. 507,666.

*To all whom it may concern:*

Be it known that I, JOHN P. HEDSTROM, a citizen of the United States, residing at Big Rapids, in the county of Mecosta and State of Michigan, have invented certain new and useful Improvements in Rests for Saw-Sharpening Machines; and I do hereby declare the following to be a full, clear, and exact description of the invention, such as will enable others skilled in the art to which it appertains to make and use the same.

My invention relates to rests for saw sharpening machines.

One object is the provision of means whereby the disagreeable chattering or vibration of a saw while being ground, is eliminated.

Another object is the provision of means whereby the wabbling of a circular saw on its arbor, is prevented.

By accomplishing these objects, I render it easier to properly grind saws.

To these and other ends, therefore, my invention consists in certain novel features and combinations of parts such as will be more fully described hereinafter and particularly pointed out in the claim.

In the accompanying drawings, Figure 1 is a diagrammatic view showing the former saw rest, Figs. 2 and 3 are similar views showing my improved saw rest associated with a saw, Fig. 4 is a front view showing a saw applied to a machine equipped with one embodiment of my invention, Fig. 5 is a detail end view, and Fig. 6 is a detail top plan view showing my invention.

In former circular saw sharpening machines it is customary to provide a mandrel receivable in the eye of the saw, the mandrel being adjusted in such a manner that the circular toothed edge of the saw extends above the frame in position to be engaged by a suitable rotatable grinding wheel. It has been customary to provide a single spring arm extending over the edge of the saw and engaging the latter at a point approximately beneath the point of engagement of the grinding wheel with the teeth, the spring arm pressing the saw against a stationary rest projecting from the frame. Owing to the flexibility of the saw, the action of the grinding wheel on the teeth causes the saw to vibrate and chatter, the unsupported portions of the saw on each side of the stationary support wabbling back and forth and rendering it difficult to properly sharpen the teeth. As a result thereof, many operators prefer to clamp the saw in a vise and sharpen the teeth by hand.

My invention is designed to prevent the wabbling of the saw and its chattering or vibration, to effect which end I provide means for rendering the saw rigid during the engagement of the grinding wheel therewith. In other words, I provide means whereby the saw is bent to take up its slack, thereby rendering the saw stiff and rigid like a board, instead of being loose and springy. The amount of flexure given the saw in order to take up the slack or spring of the blade varies, depending upon the size of the saw and the amount of tension it possesses. In other words, the amount of spring or give in the saw and the distance that it will bend before becoming stiff and rigid depends upon the amount of tension in the saw.

Fig. 1 illustrates diagrammatically the former arrangement by which the saw is caused to engage a single rest located substantially in the vertical diameter of the saw. In this figure A indicates a saw, 1, the stationary rest, and 2, the spring arm constructed in any convenient manner. From an inspection of Figs. 1 and 6, it will be seen that where a single stationary rest is employed, no support whatever is afforded the saw, aside from the one point of engagement between the spring arm 2 and the saw, and the engagement of the grinding wheel 3 with the edge of the saw will cause the saw to flap or oscillate, due to its flexibility and the tension of the metal. In order to overcome these disadvantages and provide not only an additional support for the saw, but means whereby the slack or flexibility of the saw is eliminated, I provide a pair of rests 4, 4, as shown in Fig. 2, such rests being carried by the frame and engaging the saw on opposite sides of the rest 1. It is important that these rests 4, 4, should extend forward into a vertical plane in advance of the vertical plane of the end of the rest 1. Fig. 2 illustrates the position of the saw relative to the rests before the spring arm 2 is applied to the saw, and Fig. 3 shows the position assumed by the parts after the spring arm 2 is placed in position. From an inspection of Fig. 3, it will be obvious that the bending or flexing of the saw in the manner there shown, operates to take up the slack or looseness of the saw to remove the springy character of the metal. By rendering these lateral rests 4, 4, adjustable horizontally, the saw may be flexed or bent into such an arc as will remove the springiness from saws of different sizes and thicknesses of metal, regulating the amount of flexure in accordance with the particular saw to be sharpened.

Figs. 4, 5 and 6 illustrate one embodiment of my invention wherein B indicates the frame of the machine, on which is supported in any suitable manner a mandrel C. The frame is provided with the usual rest 1 and spring arm 2, all of which are common in the art and need no further description.

In carrying out my invention, I affix a bar 5 to the frame B, such bar being provided with a horizontally extending slot 6. The inner face of the bar is provided with the ribs 7, 7, adapted to strengthen and render the bar rigid, such ribs being located on opposite sides of and extending parallel with the horizontally extending slots 6, 6. Headed bolts 8, 8, are adjustably received in the slots, such bolts being provided with the usual tightening nuts 9, and adapted to support the slotted arms 10, 10, such arms each being provided at one end with a boss 11. The bosses are provided with threaded apertures adapted to receive the threaded stocks 12 carrying heads which constitute the rests 4, 4. The slot 6 permits the adjustment laterally of the rests 4, 4, to accommodate saws of varying diameters. The slotted arms 10, 10, permit the adjustment of these rests to take against the saw at any suitable point at or near its periphery, on opposite sides of the stationary rest 1, and the adjustment of the stocks 12 relative to the arms permits the saw-engaging heads of the rests to be moved outward and inward relative to the stationary rest 1, to effect a more or less flexure of the saw, depending upon the tension of the latter.

The application of the spring arm to the saw, as shown in Figs. 3, 4 and 6, will bend the saw to the desired arc of curvature, which will prevent the vibration or chattering of the saw during the engagement of the grinding wheel 3 therewith.

Although the drawings disclose saws having plane faces, it is possible to apply the same principle to saws of a concavo-convex shape, the object then being to straighten the saw instead of bend it.

When saws are supported in the manner shown diagrammatically in Fig. 1, the spring or tension in the saw will permit its opposite sides to vibrate in both directions, and the mere location of additional rests in line with the original rest projecting outward to the same vertical plane, would make little if any difference in the vibration of the saw, but by extending such rests beyond the vertical plane of the outer end of the stationary rest 1, a new principle is made use of, whereby I am enabled to temporarily eliminate the vibration or spring of the saw while being sharpened, thereby effecting an entirely different result from the mere use of additional rests similar to rest 1, and taking up the slack in the saw to render the latter rigid and stiff, and the tension of the saw is utilized to hold the saw rigidly against the lateral rests 4, 4. Heretofore such tension was not utilized, but by the employment of my invention, the saw is held as stiff as though a broad clamp extending from edge to edge of the saw were used.

Having thus fully disclosed my invention, what I claim as new, is:—

In a saw sharpening machine, the combination with a saw-supporting mandrel, of a stationary support located apart from said mandrel, a pair of rests located at opposite sides of but in alinement with said stationary support and having their working faces located in a plane in advance of the working face of said central support; and an arm located intermediate said pair of rests and in alinement therewith and adapted to press the saw disk against said pair of rests and against said central support, whereby to bend the saw to prevent vibration of the saw disk while subjected to the action of a grinding wheel.

In testimony whereof, I affix my signature in presence of two witnesses.

JOHN P. HEDSTROM.

Witnesses:
H. J. HEYDENBURG,
E. D. SANFORD.

---

Copies of this patent may be obtained for five cents each, by addressing the "Commissioner of Patents, Washington, D. C."